United States Patent Office 2,928,874
Patented Mar. 15, 1960

2,928,874

BISHYDANTOIC ACID AMIDES FROM α,ω-DIAMINES

Seymour L. Shapiro, Hastings on Hudson, and Louis Freedman, Bronxville, N.Y., assignors to U.S. Vitamin and Pharmaceutical Corporation, New York, N.Y., a corporation of Delaware No Drawing. Application January 7, 1959
Serial No. 785,333

6 Claims. (Cl. 260—553)

This invention is concerned with N,N'-polymethylene-bis-hydrantoamides of the following formula

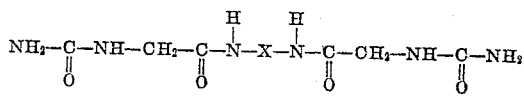

where X is a polymethylene chain of the type

—(CH$_2$)$_n$— wherein $n$ is a small whole number ranging from 4–7, and an xylylene group of the type

The compounds of this invention are stable, high-melting, white, somewhat water-soluble, crystalline solids which are conveniently prepared by reaction of the diamine NH$_2$—X—NH$_2$ with ethyl hydantoate in a lower alcohol.

The compounds of this invention show a variety of valuable pharmacological properties, particularly in their effect on the central nervous system, wherein anticonvulsant effects, depression of the central nervous system, and potentiation of Metrazole convulsions are noted effects with individual species.

This invention will be more fully described from the examples which follow. These examples are set forth by way of illustration only, and it will be understood that the invention is not to be construed as limited in spirit or in scope by the details contained therein, since many modificatiosn in materials and methods will be apparent from this disclosure to those skilled in the art.

EXAMPLE 1

As typical of the bis-hydantoamides obtained from reaction of polymethylene amines of the type NH$_2$—X—NH$_2$, the following experimental procedure is given.

A solution of 6.5 g. of ethyl hydantoate in 50 ml. of methanol was treated with 3.0 g. (0.037 equivalent) of 72% aqueous 1,6-hexanediamine. After storage at 20° C. for several days, the product (4.77 g.), M.P. 210–220° C. was separated in 81% yield and upon recrystallization (ethanol-water) the formed N,N'-hexa-methylene-bis-hydantoamide melted at 221–222° C.

*Analysis.*—Calcd. for C$_{12}$H$_{24}$N$_6$O$_4$: C, 45.6; H, 7.7; N, 26.6. Found: C, 45.8; H, 7.7; N, 26.6.

In a similar manner and using variants of

NH$_2$(CH$_2$)$_n$NH$_2$ the corresponding bis-hydantoamides characterized in Table I were prepared.

Table I

BIS-HYDANTOAMIDES

| n | M.P., °C. | Formula | Analyses, percent | | | | | |
|---|---|---|---|---|---|---|---|---|
| | | | Carbon | | Hydrogen | | Nitrogen | |
| | | | Calcd. | Found | Calcd. | Found | Calcd. | Found |
| 2 | 233–234 | C$_8$H$_{16}$N$_6$O$_4$ | 36.9 | 36.8 | 6.2 | 6.1 | 32.3 | 32.4 |
| 3 | 226–228 | C$_9$H$_{18}$N$_6$O$_4$ | 39.4 | 39.3 | 6.6 | 6.4 | | |
| 4 | 242–244 | C$_{10}$H$_{20}$N$_6$O$_4$ | 41.7 | 41.8 | 7.0 | 7.1 | 29.2 | 28.6 |
| 5 | 246–247 | C$_{11}$H$_{22}$N$_6$O$_4$ | 43.7 | 43.4 | 7.3 | 6.7 | 27.8 | 27.9 |
| 7 | 230 | C$_{13}$H$_{26}$N$_6$O$_4$ | 47.3 | 47.2 | 7.9 | 7.8 | 25.4 | 25.3 |

EVAMPLE 2

A solution of 6.85 g. of ethyl hydantoate in 50 ml. of hot methanol was cooled and treated with 2.70 g. of m-xylene diamine. After storage at 20° C. for 72 hours, the product, 2.9 g. (44%), was separated and recrystallized (ethanol-water) and melted at 220–222° C.

*Analysis.*—Calcd. for C$_{14}$H$_{20}$N$_6$O$_4$: C, 50.0; H, 6.0; N, 25.0. Found: C, 49.8; H, 6.0; N, 25.0.

The product so formed is the N,N'-(m-xylylene)-bis-hydantoamide and has the following structure:

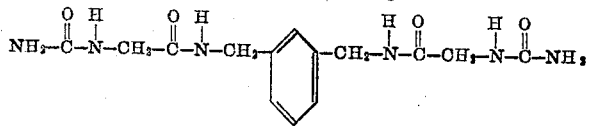

In a similar manner using oxylylene diamine, and p-xylylene diamine, the corresponding N,N'-o- and p-xylylene-bis-hydantoamides may be prepared.

The novel compounds of this invention can be combined with solid or liquid pharmaceutical carriers and formulated in the form of tablets, powder packets or capsules, or dissolved in suitable solvents for oral and parenteral administration for human or veterinary use.

It is to be understood that it is intended to cover all changes and modifications of the examples herein chosen for the purpose of illustration which do not constitute departures from the spirit and scope of the invention.

We claim:

1. The compound

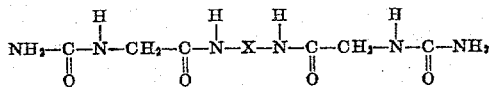

wherein X is selected from the group consisting of

and

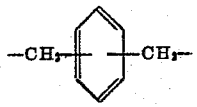

where $n$ is an integer selected from the group consisting of 4–7.

2. The compound of claim 1, wherein X is

and $n$ is 4.

3. The compound of claim 1, wherein X is

and $n$ is 5.

4. The compound of claim 1, wherein X is

and $n$ is 6.

5. The compound of claim 1, wherein X is

and $n$ is 7.

6. The compound of claim 1, wherein X is m-xylylene.

No references cited.